United States Patent
Clift et al.

(10) Patent No.: US 8,060,881 B2
(45) Date of Patent: Nov. 15, 2011

(54) SMALL BARRIER WITH LOCAL SPINNING

(75) Inventors: Neill M. Clift, Kirkland, WA (US); Arun U. Kishan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1187 days.

(21) Appl. No.: 11/803,457

(22) Filed: May 15, 2007

(65) Prior Publication Data
US 2008/0288750 A1 Nov. 20, 2008

(51) Int. Cl.
G06F 9/46 (2006.01)
(52) U.S. Cl. .............................. 718/102; 718/106
(58) Field of Classification Search ................ None
See application file for complete search history.

(56) References Cited

U.S. PATENT DOCUMENTS

| | | | |
|---|---|---|---|
| 5,434,995 A | 7/1995 | Oberlin et al. | |
| 5,692,193 A * | 11/1997 | Jagannathan et al. | 718/106 |
| 6,330,619 B1 * | 12/2001 | Kreuzburg | 713/375 |
| 7,487,501 B2 * | 2/2009 | Silvera et al. | 718/100 |
| 7,512,950 B1 * | 3/2009 | Marejka | 718/106 |
| 7,844,973 B1 * | 11/2010 | Dice | 718/108 |
| 2002/0138507 A1 | 9/2002 | Shuf et al. | |
| 2004/0187118 A1 | 9/2004 | Blainey et al. | |
| 2005/0050374 A1 * | 3/2005 | Nakamura et al. | 713/375 |
| 2005/0080981 A1 | 4/2005 | Archambault et al. | |
| 2005/0081204 A1 * | 4/2005 | Schopp | 718/100 |
| 2006/0190510 A1 | 8/2006 | Gabryjelski et al. | |
| 2007/0016905 A1 | 1/2007 | Rector et al. | |

OTHER PUBLICATIONS

Busy-Wait Barrier Synchronization Using Distributed Counters with Local Sensor Guansong Zhang, Francisco Martinez, Arie Tal, and Bob Blainey WOMPAT 2003, LNCS 2716, pp. 84-98 Year of publication 2003.*

A Quantitative Architectural Evaluation of Synchronization Algorithms and Disciplines on ccNUMA Systems: The Case of the SGI Origin2000 Dimitrios S. Nikolopoulos and Theodore S. Papatheodorou Year of publication: 1999.*

"Scalable Shared Memory Scalable Shared Memory Systems", http://www.lrr.in.tum.de/~weidendo/lehre/CSE-ScShM-05/06ScSMS.pdf.

Dusseau, et al., "Effective Distributed Scheduling for Parallel Scheduling for Parallel Workloads", Date: 2005, http://www.cs.umd.edu/class/fall2005/cmsc714/Lectures/saha-scheduling-2up.pdf.

Martinez, et.al., "Speculative synchronization: programmability and performance for parallel codes", Date: 2003, http://iacoma.cs.uiuc.edu/iacoma-papers/ieemicro03.pdf.

Schlatter, Kevin, "Shared Memory", Date: 2001, http://carbon.cudenver.edu/csprojects/CSC5809S01/Synch/event.html.

* cited by examiner

*Primary Examiner* — Lewis Bullock, Jr.
*Assistant Examiner* — Paul Mills

(57) ABSTRACT

A barrier with local spinning. The barrier is described as a barrier object having a bit vector embedded as a pointer. If the vector bit is zero, the object functions as a counter; if the vector bit is one, the object operates as a pointer to a stack. The object includes the total number of threads required to rendezvous at the barrier to trigger release of the threads. The object points to a stack block list that describes each thread that has arrived at the barrier. Arriving at the barrier involves reading the top stack block, pushing onto the list a stack block for the thread that just arrived, decrementing the thread count, and spinning on corresponding local memory locations or timing out and blocking. When the last thread arrives at the barrier, the barrier is reset and all threads at the barrier are awakened for the start of the next process.

17 Claims, 10 Drawing Sheets

SMALL BARRIER WITH LOCAL SPINNING

BACKGROUND

Some algorithms have inherently parallelizable structure due to non-overlapping data. For example, matrix multiplication requires each row of one matrix to be multiplied by the column of a second matrix (the inner product). This matrix product could be computed by multiple threads concurrently in a number of different ways. For example, one thread could multiply row $a_1$ by each column $b_1$ while another n−1 threads do the remaining rows. The outputs do not overlap as each row and column generates one distinct scalar in the product matrix.

This notion gives rise to an idea of a primitive that contracts out disjoint work items to threads, knows when the threads have completed the associated work, and hence, is safe to process and generate the output. If the work to be done has multiple steps this generalizes to a primitive that handles multiple stages where at each stage threads wait for all other threads to complete before all move to the next stage. Each stage may safely read the data from previous stages as it can be guaranteed that every thread has completed previous stages before continuing to the next. In the literature this construct is known as a barrier.

One conventional algorithm used for barrier synchronization is a sense reversing barrier that uses a thread local Boolean flag to maintain the parity of the work stage and counters to track the threads joining the barrier. In earlier work, the sense reversing barrier was enhanced to eliminate the thread local storage and provide a barrier that could spin and block on late arrival of threads. However, this generates a large structure footprint (e.g., in memory for both user mode and kernel mode). Moreover, attempts at memory contention issues have been addressed with constructs such as the combining tree barrier, but at the expense of additional storage.

If a thread is put to sleep to wait for some event to come true, there is a fixed cost associated with this process, which is basically the cost to go into the operating system, go to sleep, and have a scheduler select another thread. This involves swap time. If the amount of time that it actually takes to complete a process is small relative to the swap time, the overhead associated with going to sleep and coming out of sleep can be avoided.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed barrier mechanism can be described as a barrier object having a bit vector embedded as a pointer. The vector can take two forms, where the form depends on the lowest bit. If the lowest bit is zero, the object functions as a counter; if the lowest bit is one, the object operates as a pointer to an object. As a counter, the object includes the total number of threads required to rendezvous at the barrier to trigger release of the threads. As a pointer, the object points to a block list that describes each thread that has arrived at the barrier. If any thread other than the last one arrives at the barrier, the thread reads the top block on the list, decrements the thread count, and pushes a block for itself onto the list. Since the count is encoded on the block previously at the head of the list, this sequence of operations can be performed atomically. The threads at the barrier then spin on corresponding local memory locations (within the block) or timeout and block. When the last thread arrives at the barrier, the barrier is reset and all threads at the barrier are awakened for start of the next process.

The disclosed barrier mechanism requires very little static storage (e.g., the size of a pointer), small runtime expansion to handle the staggered arrival of threads (small blocks), and local spinning on blocks before blocking to achieve enhance cache locality. These blocks can be cheaply and efficiently allocated from the local stack of the thread arriving at the barrier. For barriers embedded in objects that have high usage counts this barrier achieves storage cost savings with improved runtime performance.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
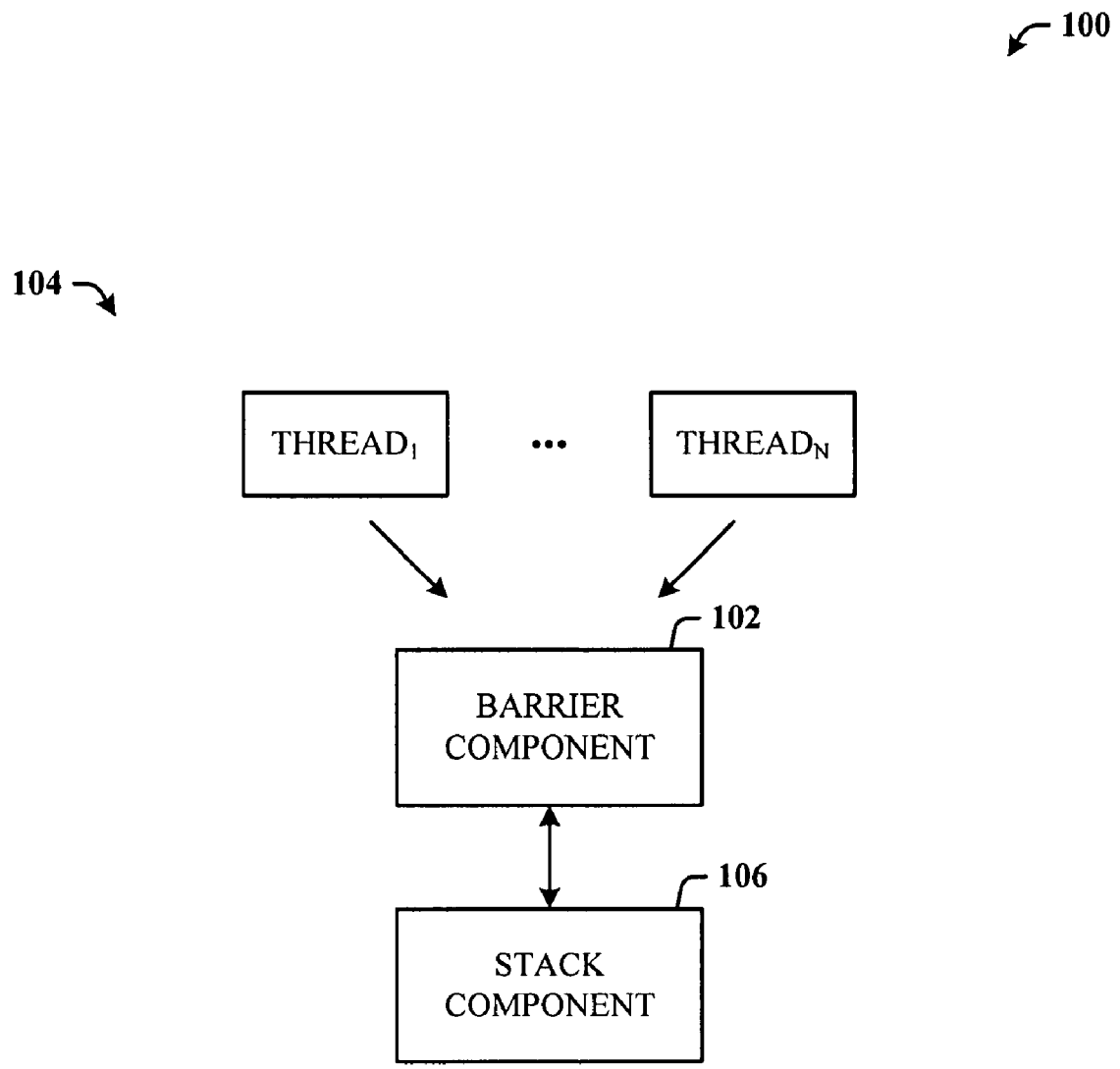
FIG. 1 illustrates a system for thread management.

Barriers provide a simple thread coordination mechanism, where threads wait at the barrier until a specified number of threads have reached the barrier. The barrier prevents threads from proceeding until an entire group of threads reaches the barrier and is ready to proceed. Threads waiting at a blocking barrier are put to sleep, or blocked, until the specified number of threads has reached the barrier. Threads waiting at a spinning barrier wait in a busy mode (or spin), until the specified number of threads has reached the barrier.

The disclosed mechanism provides barrier management by using storage the size of a pointer. The mechanism accommodate minimum runtime expansion to handle the staggered arrival of threads via stack blocks, and local spinning on the stack blocks before blocking, to achieve enhanced cache locality. The mechanism is particularly useful of low-level parallel data structures and algorithms that use managed code that takes advantage of multi-processor and multi-core architectures.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a system 100 for thread management. The system 100 can include a barrier component 102 for processing threads 104 (denoted $THREAD_1, \ldots, THREAD_N$, where N is a positive integer) locally at corresponding memory locations when meeting a process barrier, and a stack component 106 for processing stack blocks associated with the threads 104 at the barrier. The barrier component 102 spins on a thread local to a corresponding thread memory location and causes a thread to sleep local to a corresponding thread memory location based on timeout of a spin process. The barrier component 102 processes the threads according to a barrier object represented as a bit vector of a pointer. The barrier object can be a pointer when a value of the bit vector is set to one or a counter when a value of the bit vector is reset to zero.

In other words, the system 100 includes computer-implemented means (e.g., the barrier component 102) for processing a thread received at a process barrier according to a barrier object, where the barrier object defined as a bit vector of a pointer. The stack component 106 facilitates controlling the thread at a local memory location based on state of a next thread relative to the barrier.

Figure 2:
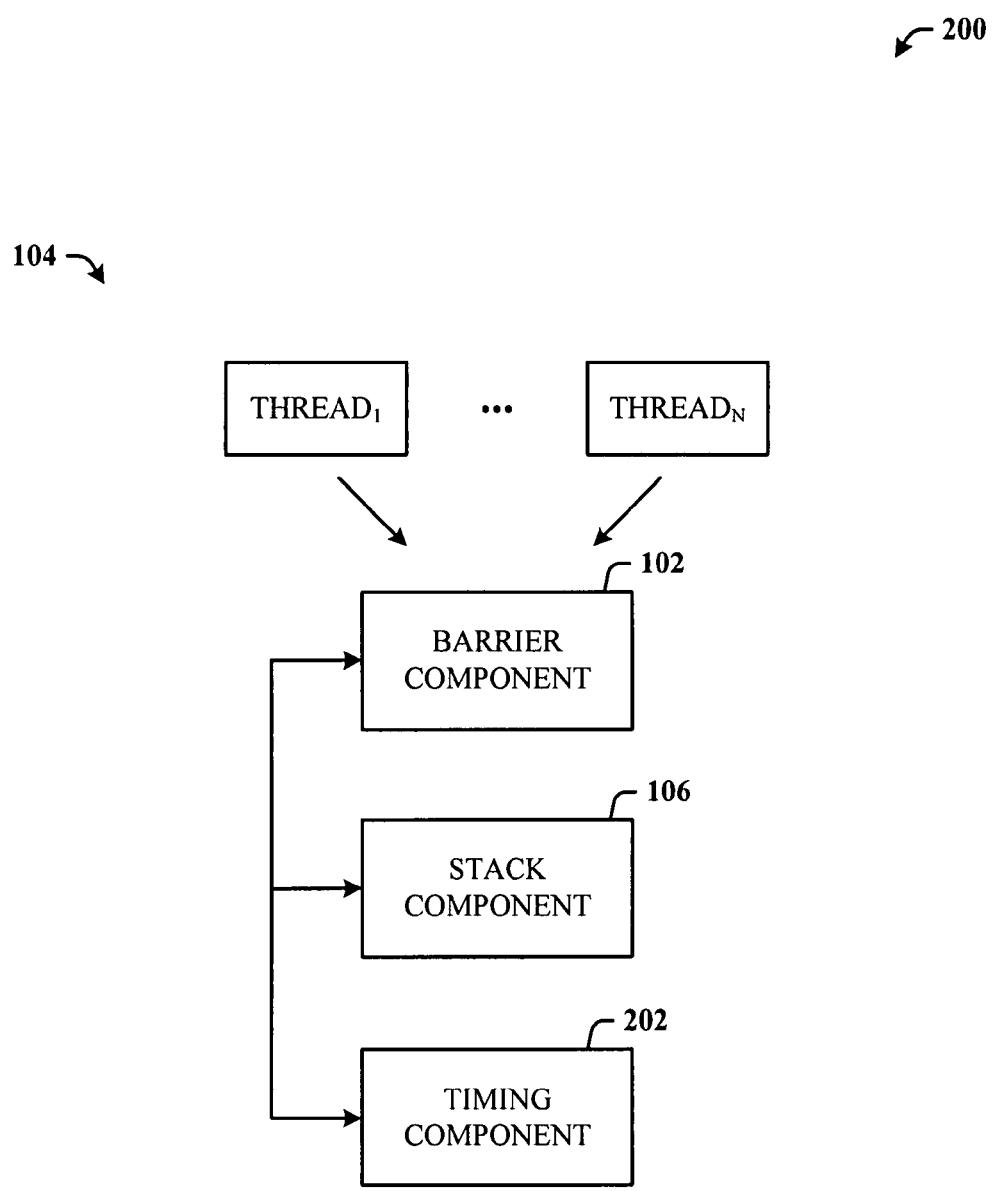
FIG. 2 illustrates an alternative system that further includes timing capability for triggering events related to barrier processes.

FIG. 2 illustrates an alternative system 200 that further includes timing capability for triggering events related to barrier processes. The system 200 includes the barrier component 102, threads 104, and the stack component 106 described above. Additionally, the system 200 can include a timing component 202, one function of which is for maintaining a thread in a spin mode based on arrival of another thread to the process barrier. The timing component 202 can also be used for waking a sleeping thread based on arrival of another thread to the process barrier.

Figure 3:
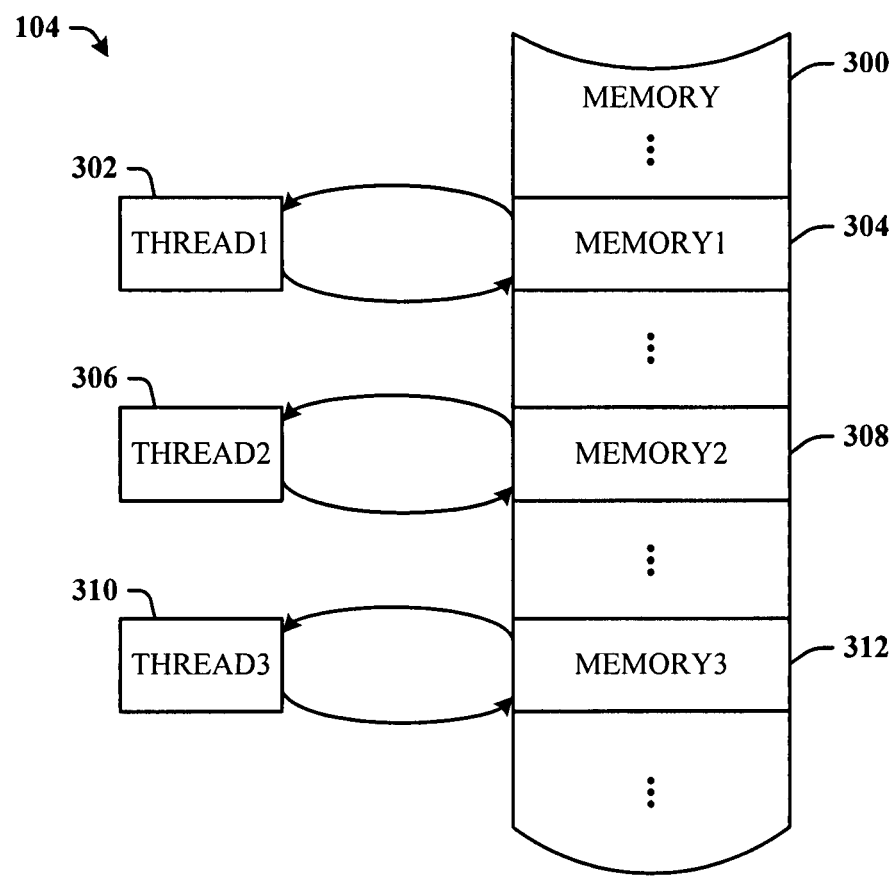
FIG. 3 illustrates that a thread spins locally to respective memory.

FIG. 3 illustrates that a thread spins locally to respective memory. A memory 300 (e.g., cache) is provided which includes memory locations via which thread processing can occur. The memory 300 be for a single processor or shared among multiple processors. For example, when a first thread 302 (denoted THREAD1) of the threads 104 reaches a barrier, the first thread 302 is caused to spin locally; in other words, to spin relative to a corresponding first memory location 304 (denoted MEMORY1). Similarly, when a second thread 306 (denoted THREAD2) reaches the barrier, the second thread 306 is caused to spin locally relative to a corresponding second memory location 308 (denoted MEMORY2). This process can continue for any number of threads. Accordingly, when a third thread 310 (denoted THREAD3) reaches the barrier, the third thread 310 is caused to spin locally relative to a corresponding third memory location 312 (denoted MEMORY3).

As indicated above, some or all of the threads 104 can be spinning. It is, however, possible that some of the threads 104 may be put to sleep and blocked due to the relatively late arrival of subsequent threads. For example, if there are only three threads, and threads 302 and 306 are spinning, it may be that the third thread 310 arrives at such a later time that threads (302 and 306) are put to sleep. However, as the last thread to arrive, the third thread will wake the first two threads (302 and 306) to synchronize the barrier, and move the barrier forward.

Figure 4:
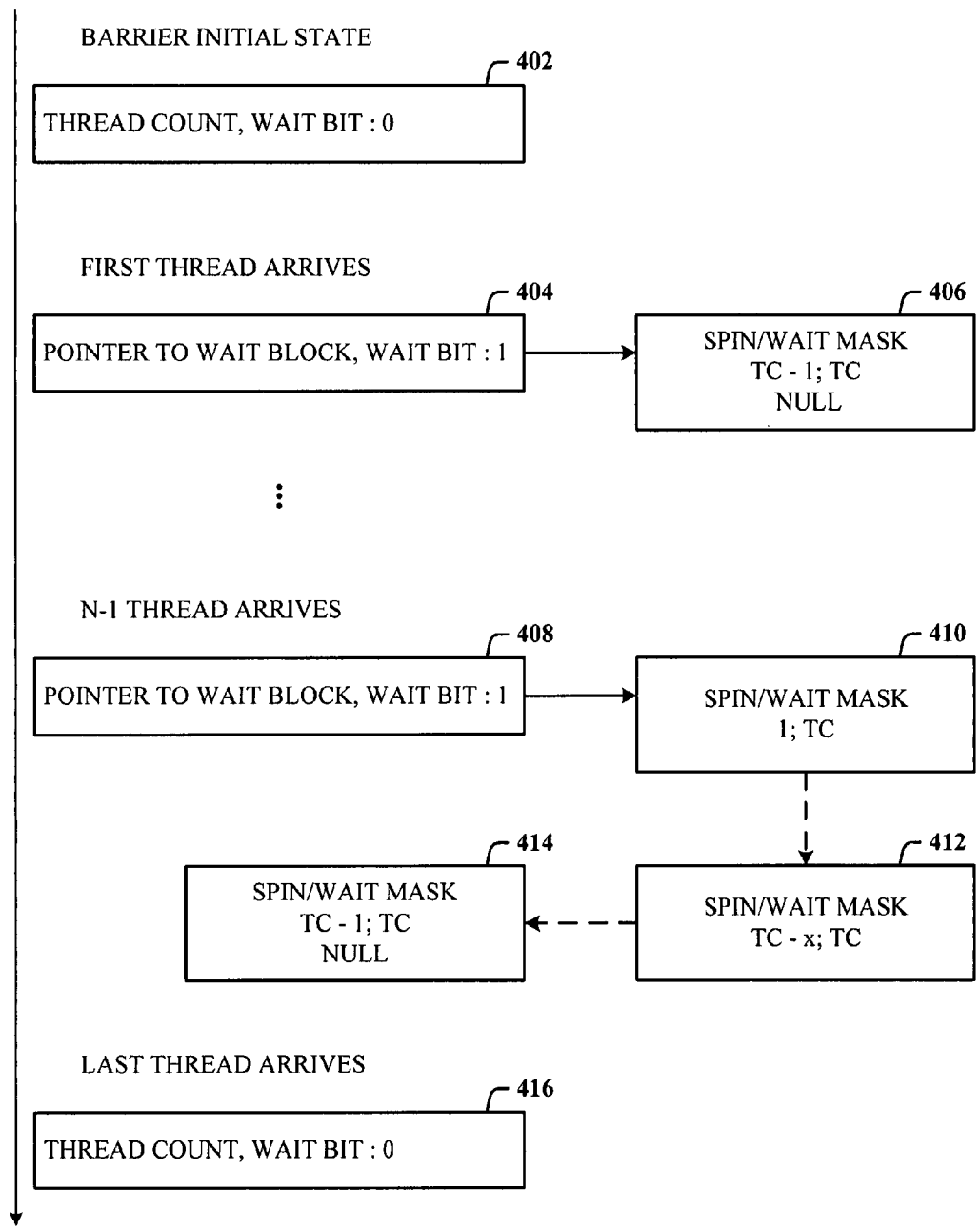
FIG. 4 illustrates a flow diagram of barrier object state during processing in accordance with localized spinning.

FIG. 4 illustrates a flow diagram 400 of barrier object state during processing in accordance with localized spinning. As a preliminary description, the barrier can be described as a bit vector embedded in a pointer. There are two forms of the vector depending on the lowest bit:

(T,W=0)

Here, when W set to 0, the vector is a counter such that T is the number of threads for triggering release on the barrier, and W is the wait bit. This is the initial value of the barrier after initialization and at the conclusion of each stage.

(P,W=1)

When W set to 1, P is an aligned pointer to a stack block list that describes each thread that has arrived at the barrier. W is a value of one signifying that at least one thread has reached the barrier.

The stack local block is a tuple with the following fields:

(T,S,N,OT)

where T is the remaining count of threads that have yet to reach the barrier (this field is valid only for the first stack block in the list), S is a spin bit used to wake each thread (e.g., when a thread is still spinning when the barrier has reached thread capacity), N is a pointer to the next stack block or NULL, and OT is the original thread count for reset.

Barrier transitions can be performed using interlocked operations. Initially, (T=n, W=0). With respect to the first arriving thread, the bit vector transitions from a counter (W=0) to a pointer (P=slb, W=1), slb is an aligned stack local block tuple with (T=n−1,S=1,N=NULL). As subsequent threads arrive at the barrier, (P=slb1, W=1) transitions to (P=slb2, W=1), where slb1 is an existing aligned stack local block tuple with (T=t,S=s,N=ptr), and slb2 is a new aligned stack local block tuple with (T=t−1,S=1,N=slb1).

Arriving at the barrier involves a thread reading the top element of the stack list and pushing a stack local block onto the stack with a number decremented. The thread then spins the local stack block waiting to be awakened, or the thread times out and blocks.

The last thread to arrive transitions from (P=slb, W=1) to (T=n, W=0). Here the last thread looks at the top stack block of the wait list, and determines that the stack T variable at the head of the list is one. The barrier is then exchanged to pop the contents of the entire stack, and the threads are released either by setting the associated spin bit or unblocking the threads.

With respect to synchronization, a thread associated with the barrier is free to look at the top of the stack or list to obtain the current thread count. This list is stable because the stack cannot be popped until all other threads have joined to the barrier. However, the last thread has yet to hit the barrier. A thread that is not the last thread can push itself to the head of the list. If a thread is the last thread, then this last thread has exclusive access to the list, can pop the stack contents completely, and walk the contents.

Continuing with FIG. 4, as previously described, the barrier object can be represented is a native pointer-sized structure (e.g., thirty two bits on 32-bit systems, sixty four bits on 64-bit systems, and so on). Representing the native bit-width as P, then barrier can be in one of two states: as a counter for tracking the number of participating threads: P-1 bits, Wait: 0 (1-bit), and as a pointer to wait block: P-1 bits, Wait: 1 (1-bit). Generally, the number of bits allocated to describe the "Wait"

field determines the alignment requirement on the blocks pushed onto the list. For example, with one bit, an alignment of two bytes is required, with two bits, an alignment of four bytes, etc.

It is assumed that the number of participating threads is known in advance such that using more than the known number is an application error. Furthermore, it is assumed that the count of threads is greater than one (or else there is no utility in using the barrier). In an initial barrier state, the barrier object at state 402 is a counter that includes a thread count and a Wait bit value of zero.

As each thread arrives, the arriving thread pushes a block on the list (or stack) using an atomic compare-and-swap. For example, at state 404, the arrival of a first thread at the barrier causes the barrier object to set the Wait bit, thereby changing the barrier object into a pointer, such that the object includes a pointer to a local stack block 406. The values in the local stack block 406 include thread count minus one (TC−1), the total thread count (TC), and pointer to the previous list head (and NULL for the original thread).

When the N-1 thread arrives at the barrier, the state 408 indicates that the barrier object is a pointer (Wait bit is set) to a local stack block 410. The N-1 thread pushes the block 410 onto the stack, over previous x (or N-2) stack blocks 412, where x is a positive integer, and stack block 414 (of the first thread).

The thread can populate the counts, since the thread can read the contents of the stack block at the head of the list (or at the top of the stack). This is because the thread implicitly has a lock on the list, since none of the blocks in the list (or lower in the stack) can be popped (or removed) until all threads have arrived at the barrier (including the thread attempting to push on the list).

A thread can identify whether it is the first, intermediary, or last thread to arrive at the barrier by applying the following rules. If the Wait bit is clear (or zero), then the thread may be the first thread to reach the barrier. If the thread fails to make the transition from the initialized state to the (P, W=1) state, another thread has taken the role of the first thread, and this thread continues as if it is a secondary or the final thread. If the Wait bit is set (or one), then the pointer is retrieved and the wait block examined. If the remaining count is one, the current thread is the last thread; otherwise, the current thread is an intermediary thread.

The transitions performed by each class of thread are noted above. All threads, barring the last thread, spin on the spin/wait mask for some non-zero interval. The wait mask consists of one value, in the following initial state:

(Thread spinning: 1)

A thread will spin on "thread spinning" for some fixed interval in the event that other threads will reach or are reaching the barrier concurrently on other processors. This amortizes the cost of having to sleep and then wake the thread if the thread leads the other threads by a short interval. Spinning on a local value rather than a global value protects the system from cache line pinging that can occur if the global value experiences intermediate updates before the desired target value is reached.

If the spin period elapses (or times out), the thread atomically clears the "spinning" bit. If the spinning bit was previously clear, the barrier has been signaled in the gap between halting spinning and attempting to wait. Otherwise, the thread will call the operating system to enter a wait state.

The last arriving thread will reset the barrier state 416 to the initial state (e.g., Thread Count, Wait: 0) before waking any threads. This is because as soon as a thread is awakened, the thread may resume execution and hit another barrier synchronization point. However, this thread will expect to find the barrier in a clean, initialized state. The total thread count (TC) is maintained in all the blocks (406, 410, 412, and 414) as an optimization for when the last thread needs to reinitialize the barrier. Alternatively, the last thread could traverse the list to proactively tabulate the count.

The last thread then walks the list, according to the following sequence of steps. The pointer to the next stack wait block is captured. The spin bit in the current block is atomically cleared. If already clear, the thread associated with the block is entering a wait state, and should be signaled (e.g., manually) via a call to the operating system. Otherwise, the spinning thread should detect the cleared bit and both sides (e.g., wait and waker) can skip the call to the operating system. If the next pointer is non-NULL, the current pointer is set to the next block, and the process repeats the steps above, beginning with the capture of the pointer to the next wait block.

Figure 5:
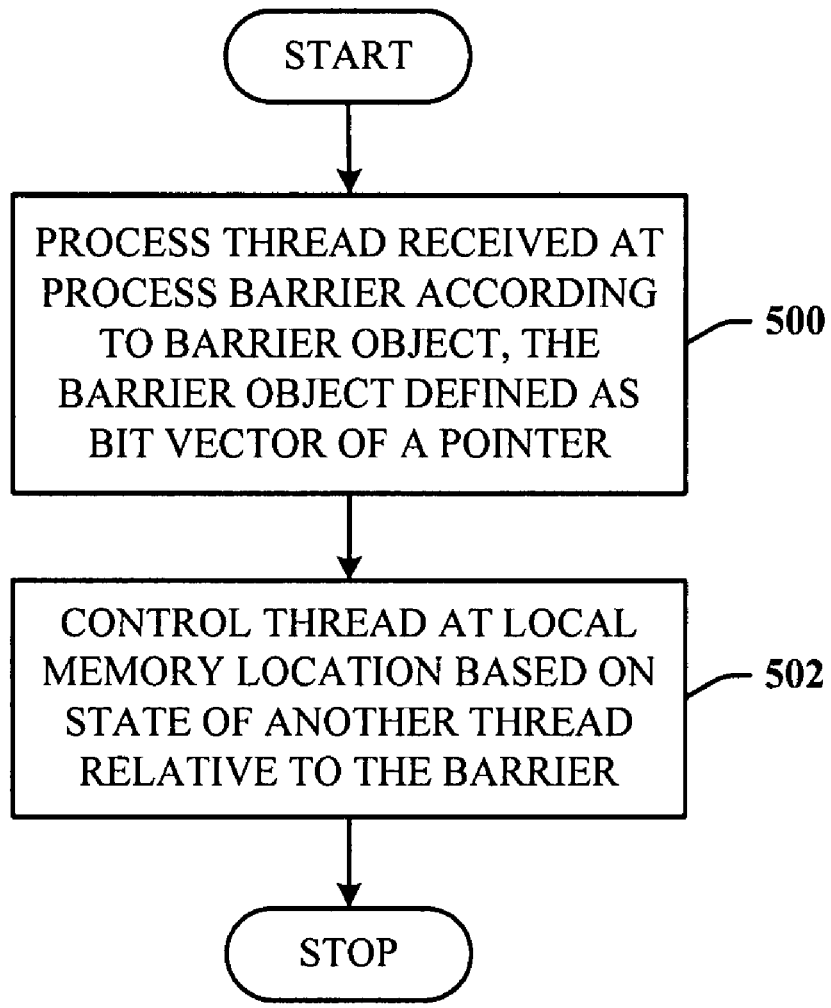
FIG. 5 illustrates a method of managing a thread barrier.

FIG. 5 illustrates a method of managing a thread barrier. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 500, a thread received at a process barrier is processed according to a barrier object, the barrier object defined as a bit vector of a pointer. At 502, the thread is controlled at a local memory location based on state of a next thread relative to the barrier. The thread is controlled by spinning the thread at the memory location or timing out and blocking the thread.

Figure 6:
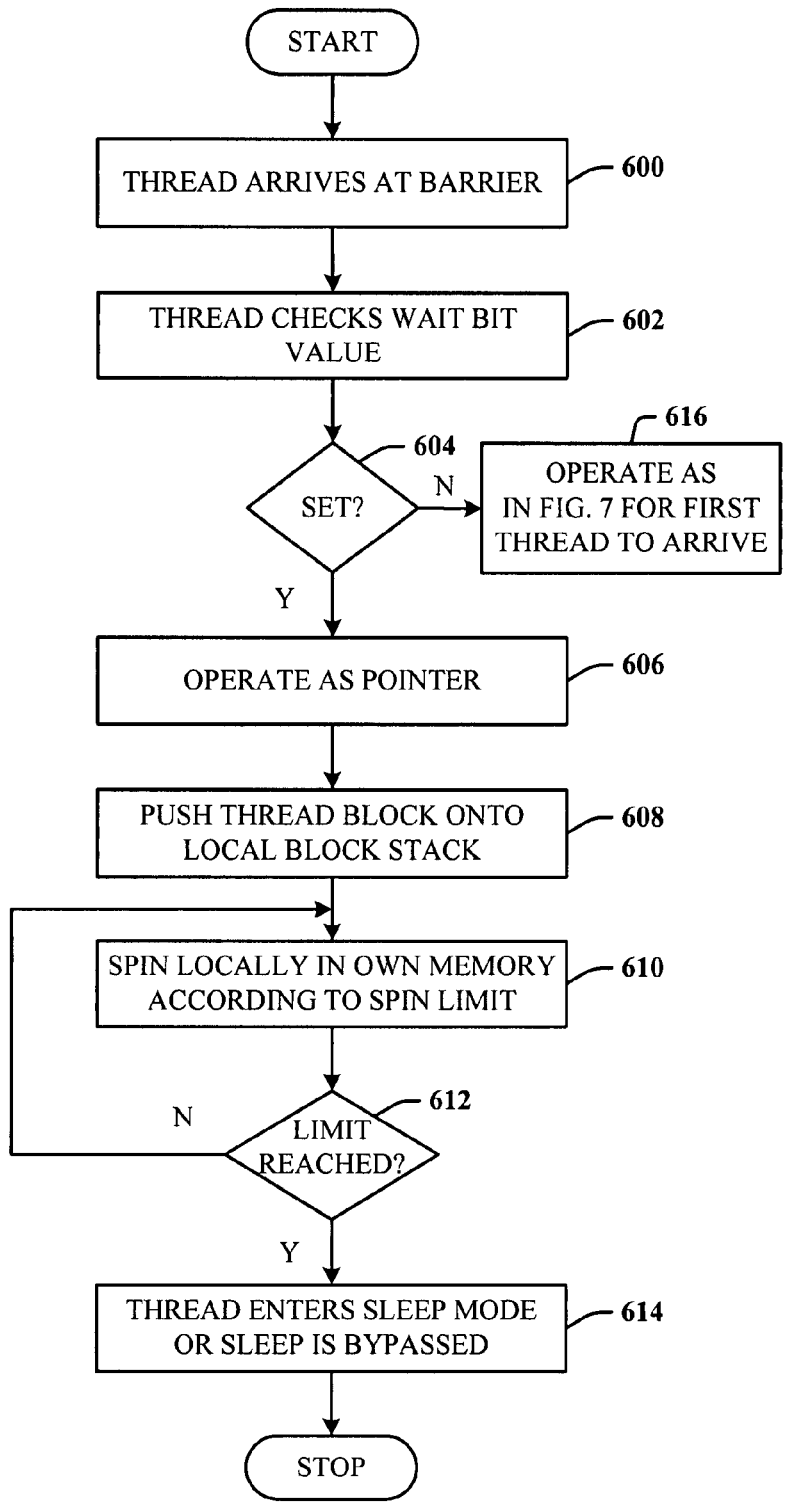
FIG. 6 illustrates a method of more specific implementation of processing a thread at a barrier.

FIG. 6 illustrates a method of more specific implementation of processing a thread at a barrier. At 600, a thread is received at the barrier. At 602, the thread checks a wait bit value. At 604, if set, flow is to 606 where the barrier operates as a pointer. At 608, a thread block is pushed onto the local stack. At 610, the thread spins locally in local thread memory according to a spin limit. At 612, if the limit has not been reached, flow is back to 610 to continue spinning. If the limit has been reached, flow is from 612 to 614 to control the thread into sleep mode and block the thread or to bypass sleep mode. If the wait bit value is not set (or clear), at 604, flow is to 616 to operate as in FIG. 7 where the thread will proceed as if it is the first thread to arrive. However, if the thread is not the first thread, this can be detected later.

Figure 7:
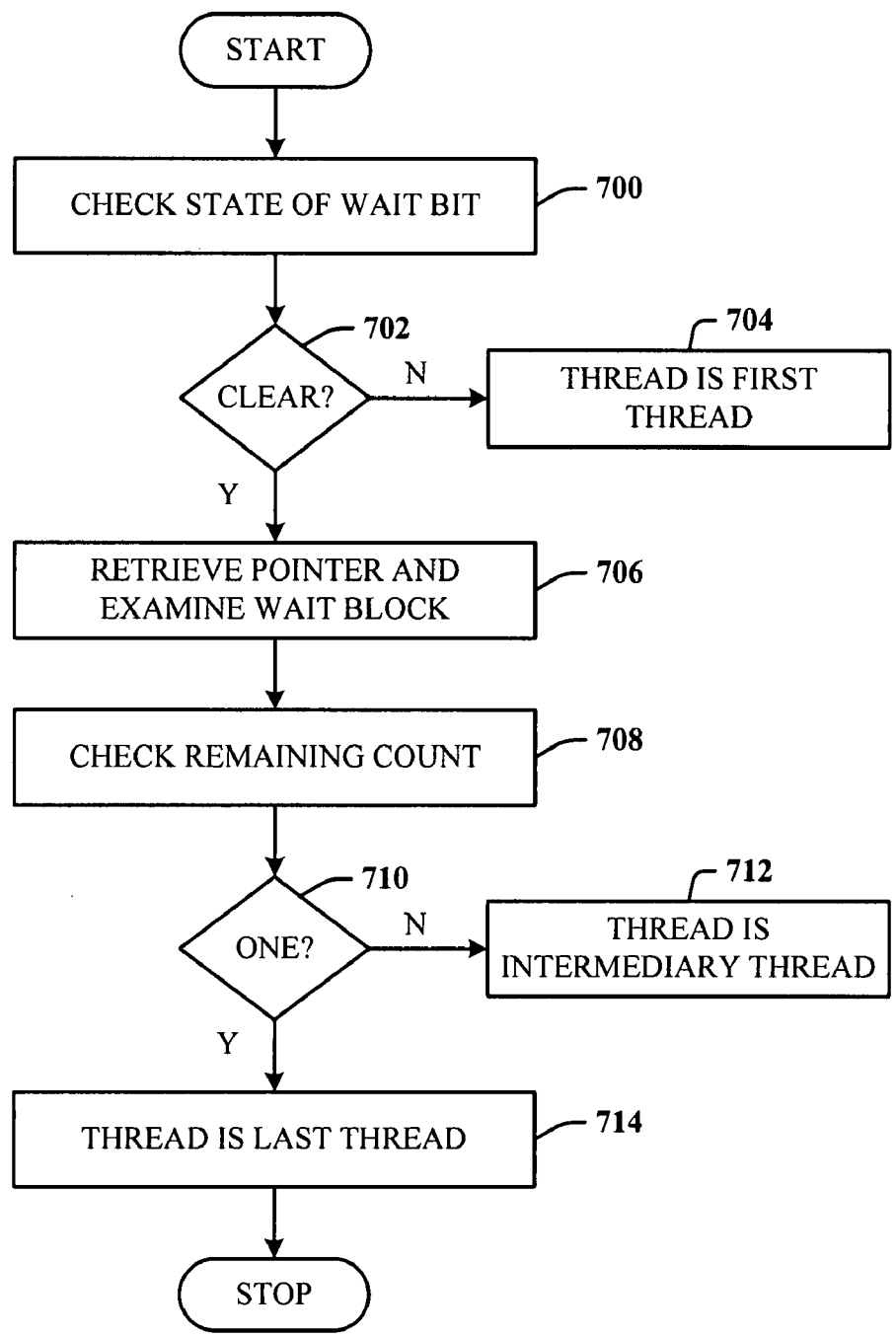
FIG. 7 illustrates a method of determining the position of a thread.

FIG. 7 illustrates a method of determining the position of a thread. At 700, a check is made of the state of the wait bit. At 702, if the wait bit is clear, the thread is the first thread to reach the process barrier, as indicated at 704. If the bit is set, flow is from 702 to 706, to retrieve the pointer and examine the wait block. At 708, a check is made to determine if the remaining count is one. At 710, if the remaining count is not one, the thread is an intermediary thread, as indicated at 712. If the remaining count is one, flow is from 710 to 714 where the thread is the last thread.

Figure 8:
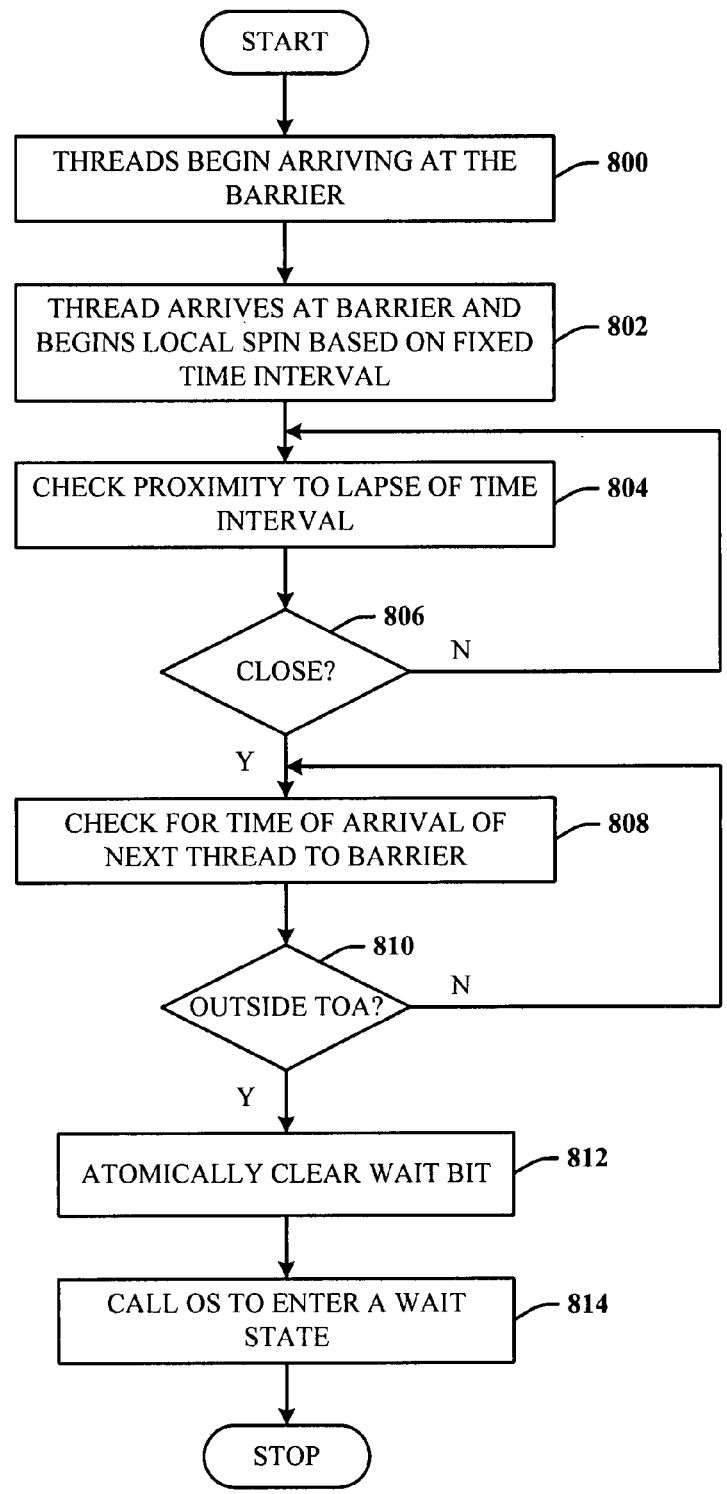
FIG. 8 illustrates a method of spinning locally based on a fixed interval to address cache line pinging.

FIG. 8 illustrates a method of spinning locally based on a fixed interval to address cache line pinging. At 800, threads begin arriving at the barrier, except a last thread. At 802, a barrier thread enters a local spinning mode based on a fixed time interval. At 804, a local check is made of proximity to lapse of time interval for the thread. At 806, if not close to lapse of the time interval, flow is back to 804 to continue checking the time interval. If lapse of the time interval is close, flow is from 806 to 808 to check for arrival time of a next thread at the barrier. If, at 810, next thread is outside of the time interval, flow is to 812 atomically clear the spin bit. In other words, if the time interval has elapsed, the thread will bypass the wait if all threads have arrived at the barrier (as detected by the spin bit being clear). Thus, the thread indirectly checks for the arrival of all threads via the atomic clear of the spin bit. At 814, the thread calls the operating system to enter a wait state if the bit was previously set.

Figure 9:
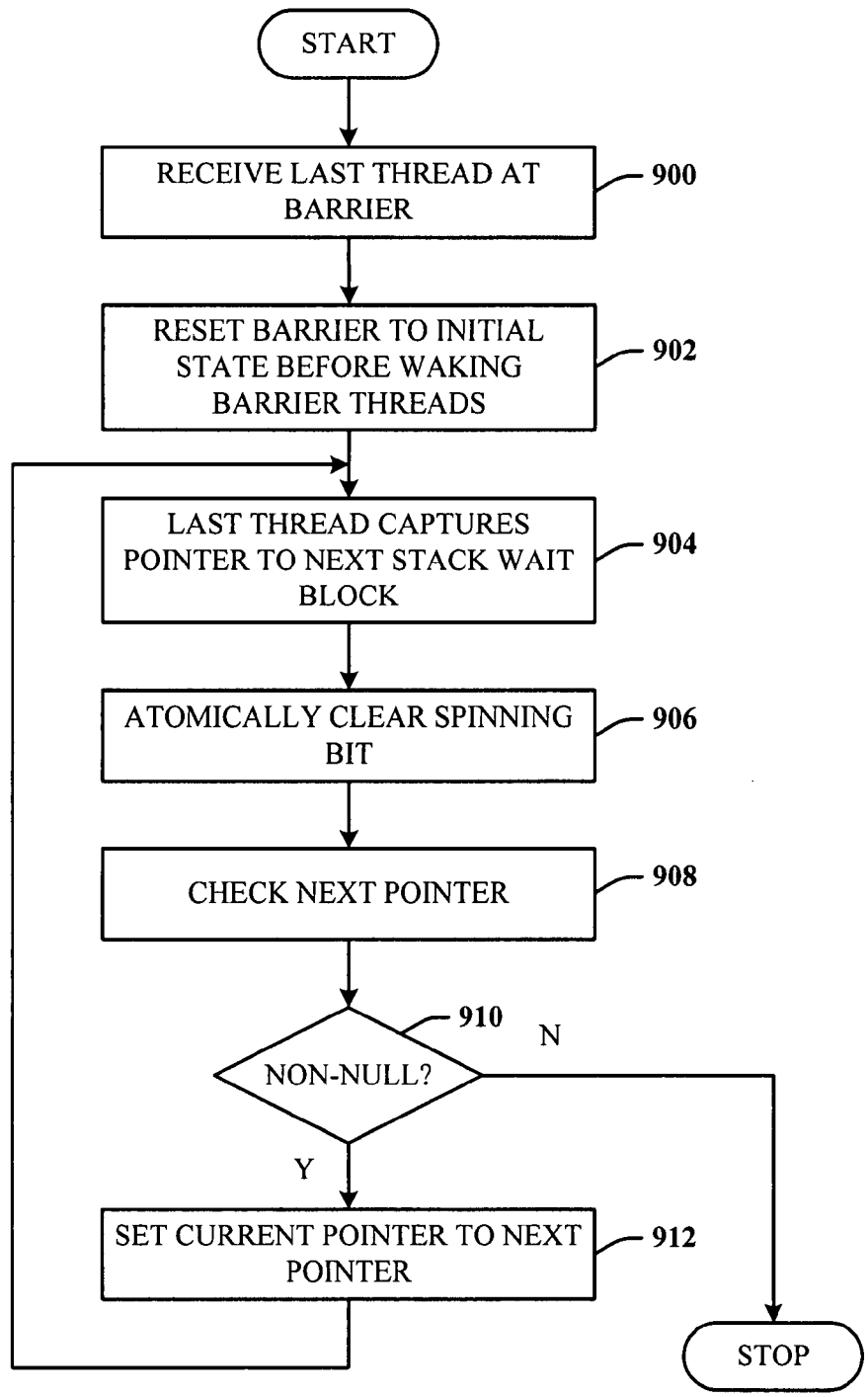
FIG. 9 illustrates a method of processing the last thread to arrive at the barrier.

FIG. 9 illustrates a method of processing the last thread when arriving at the barrier. At 900, the last thread arrives at the barrier. At 902, the barrier is reset to its initial state before awakening the barrier threads. At 904, the last thread captures the pointer to the next stack wait block. At 906, the thread atomically clears the spinning bit. At 908, the thread checks the next pointer. At 910, if the next pointer is non-null, flow is to 912 to set the current pointer to the next pointer, and return to 904. If the pointer is the null, flow is from 910 to stop.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
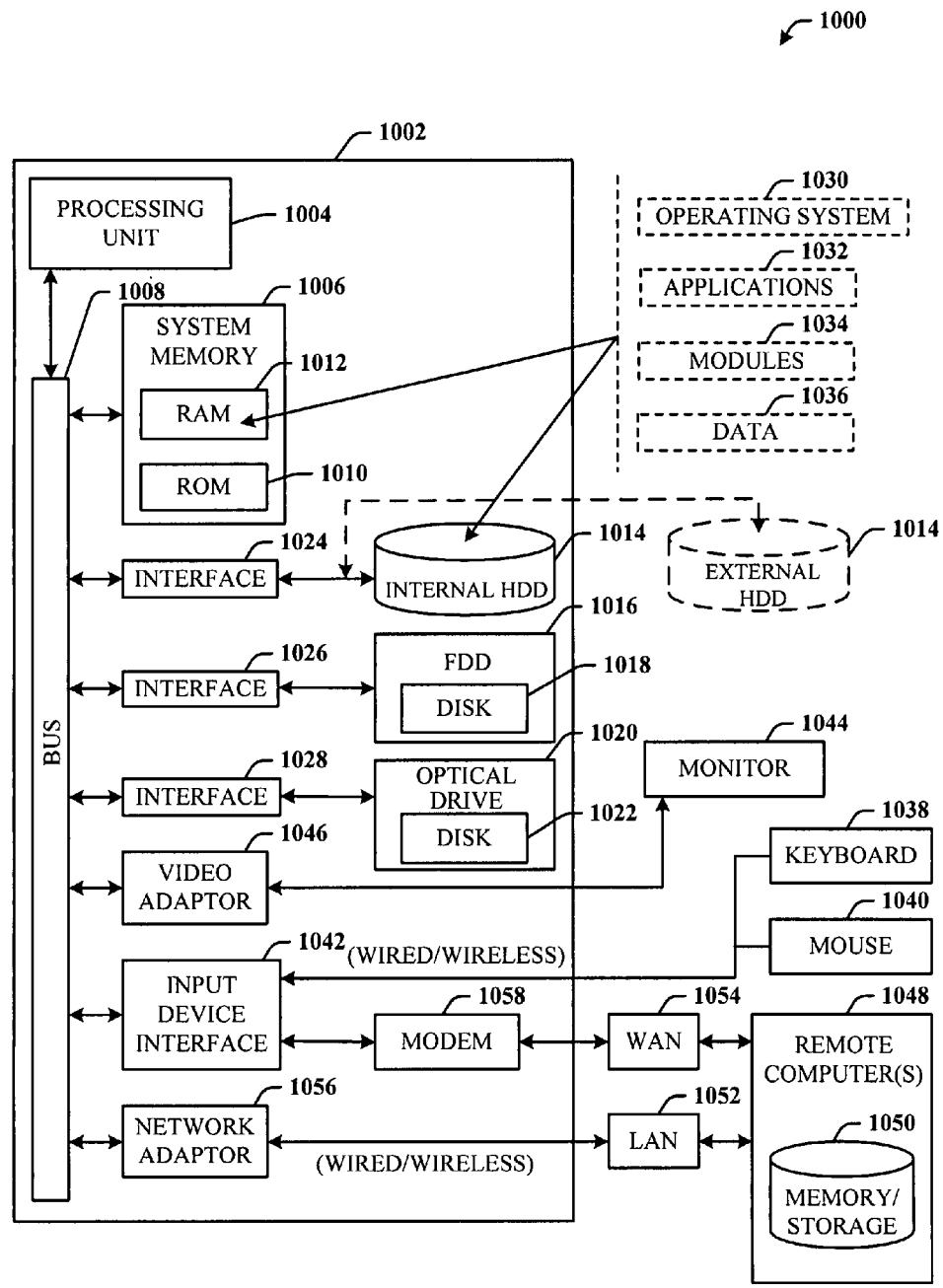
FIG. 10 illustrates a block diagram of a computing system operable to execute local barrier spinning in accordance with the disclosed architecture.

Referring now to FIG. 10, there is illustrated a block diagram of a computing system 1000 operable to execute local barrier spinning in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. The one or more application programs 1032, other program modules 1034 and program data 1036 can include the barrier component 102 and stack component 106 of FIG. 1, and timing component 202 of FIG. 2.

All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wire and/or wireless communication network interface or adapter 1056. The adaptor 1056 may facilitate wire or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for thread management, comprising:
   a processor; and
   a memory comprising computer-readable instructions executable by the processor, the instructions including:
   a barrier component for spinning threads at corresponding local memory locations when meeting a process barrier according to a barrier object by invoking a stack component as the threads arrive at the process barrier, wherein the barrier object is defined as a bit vector that functions as a counter that specifies a total number of threads required to rendezvous at the process barrier to trigger release of the threads when no threads are waiting at the barrier, and as a pointer to a stack block list when at least one thread is waiting at the process barrier; and
   the stack component for creating and linking the stack blocks of the stack block list, wherein each stack block is associated with a respective one of the threads waiting at the barrier and is a tuple having at least a field related to the total number of threads.

2. The system of claim 1, wherein the local memory location is in cache memory accessible by one or more processes and the processor.

3. The system of claim 1, wherein the barrier component sleeps a thread local to the corresponding memory location based on timeout of the spin process.

4. The system of claim 1, wherein when the barrier object is a pointer a wait bit of the bit vector is set to one.

5. The system of claim 1, wherein when the barrier object is a counter a wait bit of the bit vector is reset to zero.

6. The system of claim 1, further comprising a timing component for maintaining a thread waiting at the process barrier in a spin mode based on arrival of another thread to the process barrier.

7. The system of claim 1, further comprising a timing component for waking a sleeping thread based on arrival of a last thread at the process barrier.

8. The system of claim 1, wherein the stack block tuple further includes fields associated with at least one of a remaining count of the threads yet to reach the barrier, a spin bit for awaking threads when the barrier reaches thread capacity, and a pointer for pointing to a next stack block.

9. A computer-implemented method of managing threads, comprising acts of:
- processing threads received at a process barrier according to a barrier object by creating and linking blocks of a block list as the threads arrive at the process barrier, the barrier object defined as a bit vector that functions as a counter that specifies a total number of threads required to rendezvous at the process barrier to trigger release of the threads when no threads are waiting at the process barrier, and as a pointer to the block list when at least one thread is waiting at the process barrier, wherein each block of the block list corresponds to a respective thread that is waiting at the process barrier;
- spinning a waiting thread at a local memory location specified in the corresponding stack block based on arrival of a next thread relative to the barrier; and
- utilizing a processor to execute instructions stored in memory to perform at least one of the acts of processing or controlling.

10. The method of claim 9, wherein the block list comprises a stack block list that tracks each thread that arrives at the process barrier.

11. The method of claim 10, wherein linking blocks of the block list comprises pushing a stack local block associated with a thread onto a head of the list pointed to by the barrier when the thread arrives at the barrier.

12. The method of claim 10, wherein creating blocks of the block list comprises reading a top stack block when a thread arrives at the barrier.

13. The method of claim 10, wherein spinning the waiting thread further comprises spinning the waiting thread based on time associated with arrival of remaining threads to the process barrier.

14. The method of claim 9, wherein the waiting thread and the next thread are associated with processes of different microprocessors.

15. The method of claim 9, further comprising waking a sleeping thread based on arrival of a last thread at the process barrier.

16. The method of claim 9, further comprising maintaining a thread count in each block of the block list.

17. A computer-implemented system, comprising:
- computer-implemented means for processing threads received at a process barrier according to a barrier object by creating and linking blocks of a block list as the threads arrive at the process barrier, the barrier object defined as a bit vector that functions as a counter that specifies a total number of threads required to rendezvous at the process barrier to trigger release of the threads when no threads are waiting at the process barrier, and as a pointer to the block list when at least one thread is waiting at the process barrier, wherein each block of the block list corresponds to a respective thread that is waiting at the process barrier;
- computer-implemented means for spinning a waiting thread at a local memory location specified in the corresponding stack block based on arrival of a next thread relative to the barrier; and
- a processor configured to execute computer-executable instructions associated with the computer-implemented means for processing and spinning.

* * * * *